United States Patent [19]

Astle

[11] Patent Number: 5,751,861
[45] Date of Patent: May 12, 1998

[54] REDUCING RESIDUAL ARTIFACTS IN VIDEO CODING SCHEMES WITH INTEGER MOTION COMPENSATION

[75] Inventor: Brian Astle, Plainsboro, N.J.

[73] Assignee: Intel Corporation, Santa Clara, Calif.

[21] Appl. No.: 497,150

[22] Filed: Jun. 30, 1995

[51] Int. Cl.$^6$ .............................. G06K 9/36; G06K 9/40; H04N 7/12
[52] U.S. Cl. .......................... 382/250; 382/268; 348/400; 348/420
[58] Field of Search .................... 382/233, 245, 382/250, 251, 253, 236, 268, 232; 348/400, 403, 413, 420, 700; 358/433, 426, 432; 345/202

[56] References Cited

U.S. PATENT DOCUMENTS

| | | |
|---|---|---|
| 4,754,492 | 6/1988 | Malvar . |
| 4,849,810 | 7/1989 | Ericsson . |
| 4,941,043 | 7/1990 | Jass . |
| 5,019,901 | 5/1991 | Uomori et al. . |
| 5,126,841 | 6/1992 | Tanaka et al. . |
| 5,146,326 | 9/1992 | Hasegawa . |
| 5,150,209 | 9/1992 | Baker . |
| 5,151,784 | 9/1992 | Lavagetto et al. . |
| 5,173,773 | 12/1992 | Ueda et al. . |
| 5,198,901 | 3/1993 | Lynch . |
| 5,220,616 | 6/1993 | Downing et al. . |
| 5,229,864 | 7/1993 | Moronaga et al. ............ 358/433 |
| 5,247,363 | 9/1993 | Sun et al. ............ 348/700 |
| 5,251,028 | 10/1993 | Iu . |
| 5,329,338 | 7/1994 | Keith . |
| 5,367,629 | 11/1994 | Chu et al. ............ 382/250 |
| 5,436,666 | 7/1995 | Astle . |

*Primary Examiner*—Leo Boudreau
*Assistant Examiner*—Wenpeng Chen
*Attorney, Agent, or Firm*—William H. Murray; N. Stephan Kinsella

[57] ABSTRACT

A computer-implemented method for decoding motion-compensated blocks of a picture of a sequence of pictures. According to a preferred embodiment, a current motion-compensation encoded block is decoded. Embedded block edges within the current block are determined, and a low-pass filter is applied along the embedded block edges.

21 Claims, 4 Drawing Sheets

REDUCING RESIDUAL ARTIFACTS IN VIDEO CODING SCHEMES WITH INTEGER MOTION COMPENSATION

BACKGROUND OF THE INVENTION

1. Field of the Invention

The present invention relates to signal processing and, in particular, to computer-implemented processes and apparatuses for filtering methods for reducing residual artifacts in video coding schemes with integer motion compensation.

2. Description of the Related Art

This invention relates to video signal processing in which video signals representative of video pictures of a motion video sequence are compressed, or encoded, to form an encoded bitstream. As used herein, "picture" and "video picture" may interchangeably refer to signals representative of an image as hereinabove described. In some encoding standards, pictures are referred to as video frames.

The portion of an encoded bitstream representing a compressed picture may be stored in a mass storage device such as a hard disk drive or compact disk read-only-memory (CD-ROM) in its compressed format in order to conserve storage space. When the compressed picture is later retrieved, it may be decompressed and, for example, displayed on a monitor. A higher amount of compression of the blocks constituting an image tends to lower the number of bits needed to represent the image, but also tends to diminish the quality of the image reconstructed by the decoder.

The encoded bitstream may also be transmitted to one or more remote signal processing systems such as video conferencing nodes which decode the encoded signals. These video conferencing nodes may be personal computer (PC)-based systems communicating with each other over a selected transmission medium. Possible transmission media include Integrated Services Digital Network (ISDN) and Public Switched Telephone Network (PSTN) telephone connections. Although ISDN connections provide a higher bandwidth than PSTN connections, ISDN connections are currently less readily available and more expensive than PSTN connections. Because transmission media have finite bandwidths, in order to provide video conferencing of satisfactory quality, each PC system preferably compresses or encodes in real time the video signals corresponding to the local participant and transmits the resulting compressed signals or bitstreams to the PC systems of the remote participants.

The objective of transmitting video information is to maximize perceived picture quality within constraints of the transmission channel. Most transmission channels have a fixed capacity, leading to a tradeoff between the quality of each picture and the picture rate. Thus, pictures may generally be transmitted at a fast rate but at a lower quality, or vice-versa. A standard transmission rate in the United States is 30 pictures/second in the International Organization for Standardization (ISO) ISO/IEC 11172 Moving Pictures Experts Group-1 standard (MPEG-1), or 30 frames/second in the ISO/IEC 13818 (MPEG-2) standard. The aforementioned MPEG-1 (ISO/IEC 11172) and MPEG-2 (ISO/IEC 13818) standards are incorporated herein in their entirety by reference. Another video coding standard is H.261 (Px64), developed by the International Telegraph Union (ITU).

In some usages, each PC system receives and decompresses compressed signals from the PC systems of remote participants to play decompressed video signals locally. Encoders may also, in some usages, encode video pictures offline to perform more computation-intensive and more efficient encoding.

Such encoding operations that compress video image signals typically operate on subsets of the image, such as (8×8) blocks of pixels, or on macroblocks comprising a number of such blocks. A macroblock typically comprises a (16×16) array of luminance pixels (also known as "luma pels") and two associated (8×8) blocks of chrominance, or chroma, pixels. The (16×16) luma array is further divided into four (8×8) blocks, and all six blocks in a macroblock are typically transformed using the forward discrete cosine transform (DCT), quantized, and further encoded. Typically, the (8×8) blocks of the image to be encoded are transformed by a forward DCT to generate a transformed signal comprising 64 DCT coefficients, which are also arranged in an (8×8) block.

Motion compensation is commonly utilized in signal processing techniques in which successive video pictures are compressed. Motion compensation techniques exploit the temporal correlation that often exists between consecutive pictures, in which there is a tendency of some objects or image features to move within restricted boundaries from one location to another from picture to picture.

For instance, picture 1 may contain an object, and picture 2 may contain an identical or very similar set of pixels corresponding to the object spatially displaced by a certain number of pixels from the location of the same set of pixels in picture 1. If picture 1 is transmitted by a video processor to a remote decoding system comprising a video processor (which performs any necessary decompression or other decoding), picture 2 may be transmitted without the pixels corresponding to the object. Instead, information such as motion vectors is sent along with picture 2 (which may also be encoded using other techniques). These motion vectors may be utilized by the remote receiving video processor when decoding the received picture 2 to reproduce the object from picture 1 at a new location within picture 2. Since motion vectors can often be represented with fewer bits than the pixels that constitute the object, fewer bits need to be transmitted (or stored) in order to recreate the object in Picture 2. As will be appreciated by those skilled in the art, difference blocks may also be transmitted along with motion vectors to improve the reconstruction process. Such difference blocks contain the residual motion error.

One problem encountered in motion compensation encoding techniques is that artifacts, sometimes referred to as residual artifacts, arise due to inaccuracies in the encoding process. One type of artifact is the block edge, or "blockiness," artifact along the boundaries of (8×8) or other sized blocks or macroblocks of a picture, due to quantization and other inaccuracies in the encoding process. Single pixel artifacts may also arise due to quantization errors. When fractional-pixel motion compensation is utilized, many of these artifacts naturally decay with time. For example, a decoded block may contain a single pixel or spike having a very high magnitude, much higher than the original encoded pixel and much higher than the surrounding pixels, for example due to an error caused by the DCT and quantization steps. If this pixel spike is present in block A of picture 1, then for successive video frames or pictures that are motion-compensated based on picture 1, any block that is matched to block A will similarly contain the pixel spike. However, where fractional-pixel motion compensation is utilized, blocks sometimes tend to match along fractional pixel boundaries. When this occurs, high-frequency artifacts such as spike pixels are effectively low-pass filtered by the fractional-pixel interpolation, and thus after a number of successive pictures such artifacts are gradually spread out across the picture and thus become invisible.

In some systems such as H.261 referenced above, however, integer-pixel motion compensation is utilized, and many such high-frequency artifacts thus tend to persist with time. In integer-pixel motion compensation schemes, block matching is performed by moving the current block over reference blocks in prior pictures, wherein the current block is displaced by a whole number of pixels. Motion vectors are thus generated in accordance with a successful match with a reference block that is displaced by an integer number of pixel rows and columns. One method for addressing such artifacts is to apply a low-pass filter to the decoded picture. Filtering in this context means "averaging" a pixel value with its neighbors, typically with the application of weights to the values first. Unfortunately, applying a low-pass filter to the decoded picture tends to filter out useful information in addition to filtering out some high-frequency noise. Such filtering of an entire image can also be computationally expensive.

There is thus a need for improved methods and apparatuses for reducing residual artifacts in video coding schemes with integer-pixel motion compensation.

SUMMARY

There is provided herein a computer-implemented method for decoding motion-compensated blocks of a picture of a sequence of pictures. According to a preferred embodiment of the invention, a current motion-compensation encoded block is decoded. Embedded block edges within the current block are determined, and a low-pass filter is applied along the embedded block edges.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Video Processing System Hardware

Figure 1:
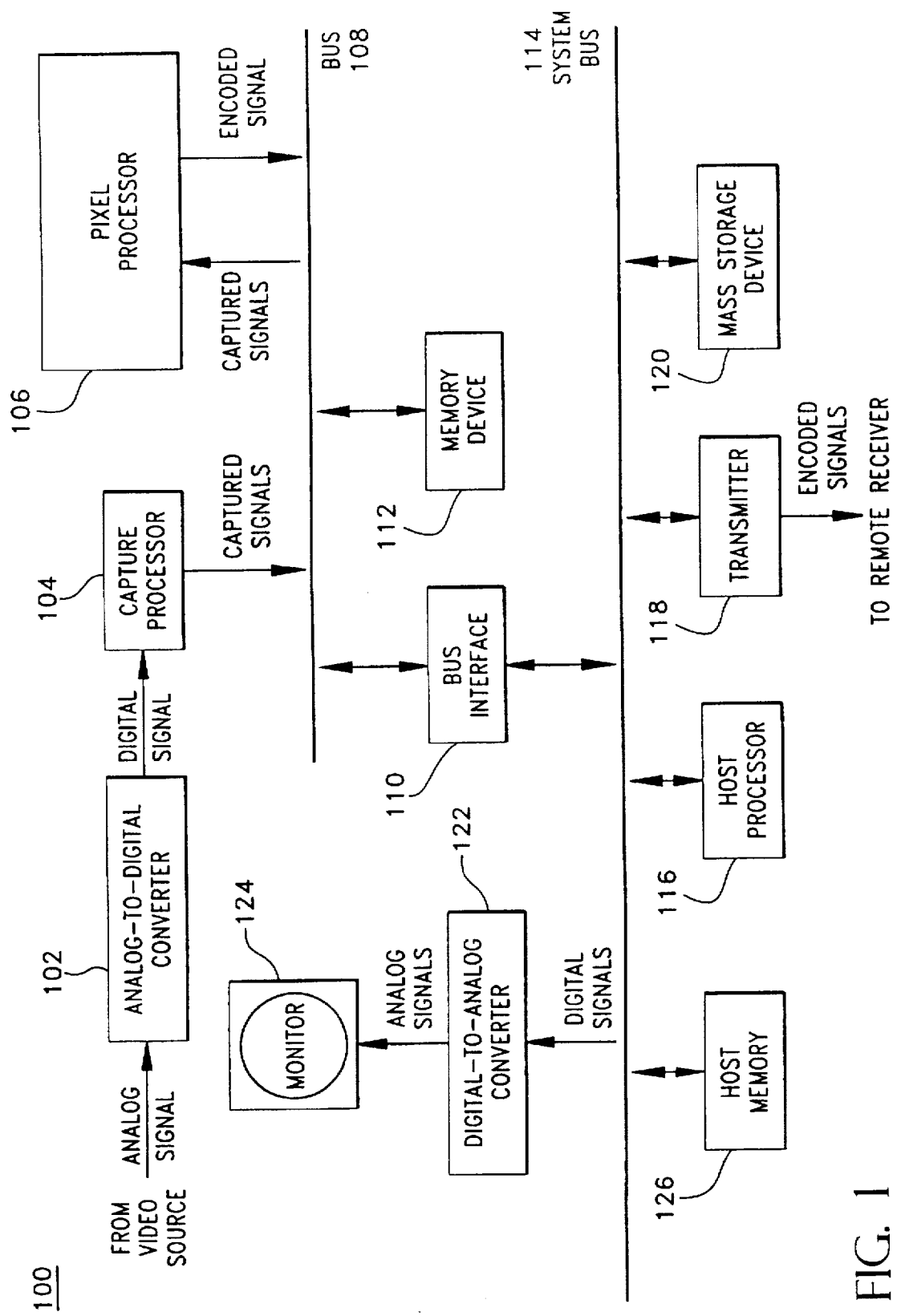
FIG. 1 is a computer-based video processing system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each picture of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, as described in more detail below, pixel processor 106 applies a sequence of compression techniques to reduce the amount of data used to represent the information in each image. The encoded image may then be stored to memory device 112 via bus 108 for transmission to host processor 116 via bus 108, bus interface 110, and system bus 114 for storage in host memory 126.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
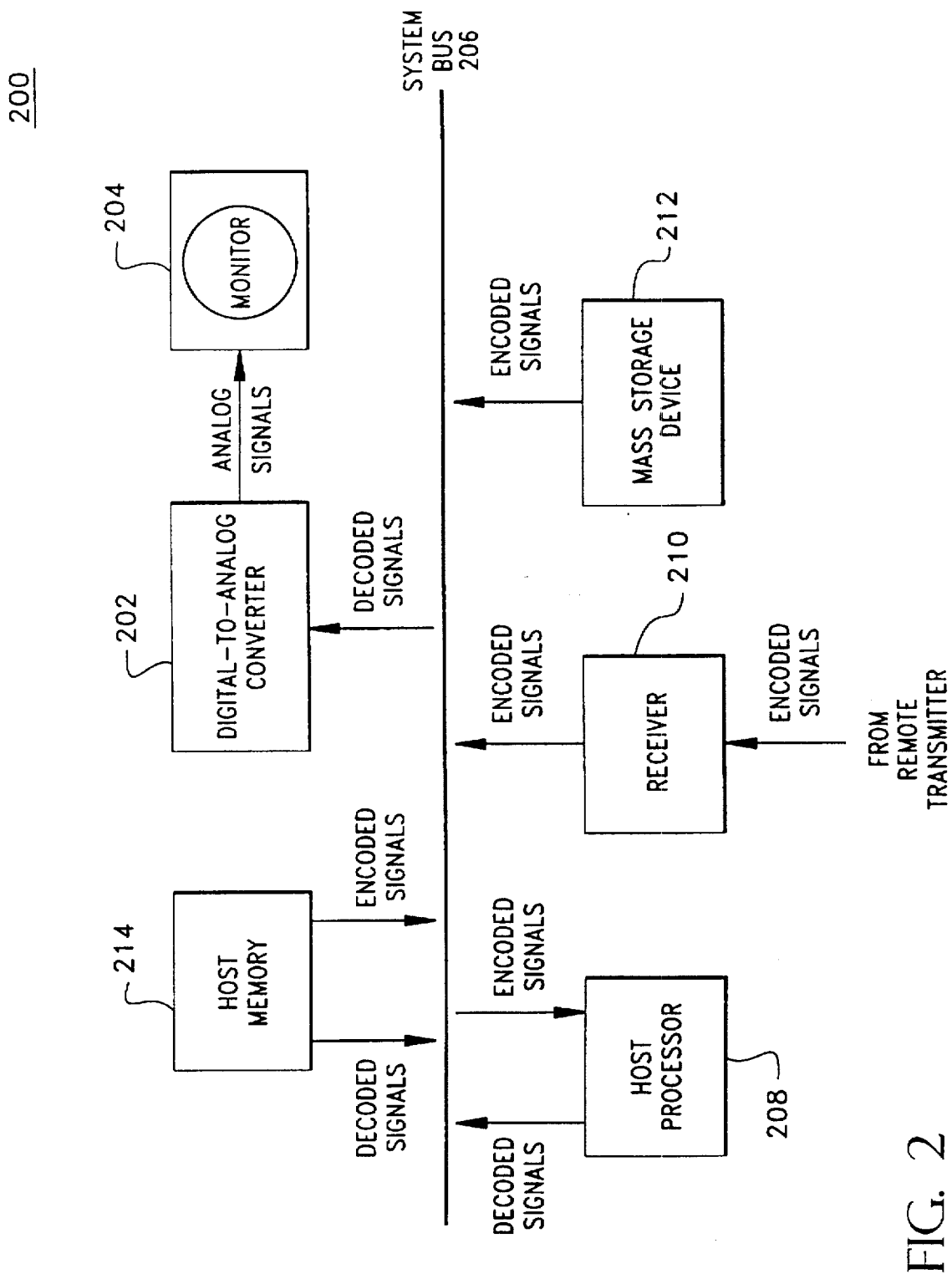
FIG. 2 is a computer-based decoding system for decoding the video signals encoded by the video processing system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled pictures. Pixel processor 106 may be any suitable means for encoding subsampled video image signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386™, 486™, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC)-based display system such as a VGA or SVGA system. Monitor 124 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding encoded picture or image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video image signals. Those skilled in the art will understand that such a combined system may be used to display decoded video image signals in real-time during the capture and encoding of video signals to monitor the encoding processing. In a preferred embodiment, encoding system 100 encodes video image signals in real time to yield an encoded bitstream, and transmits the encoded bitstream to decoding system 200. Encoding system 100 implements the present invention as described in further detail hereinbelow.

Block Edge Artifacts

Figure 3:
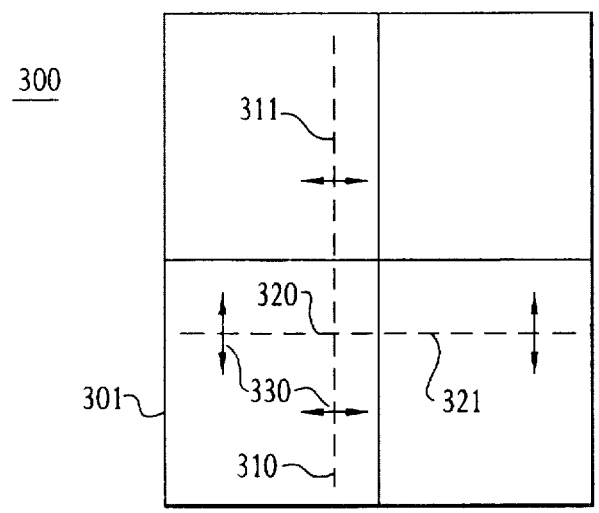
FIG. 3 illustrates embedded block edge artifacts reduced in accordance with a preferred embodiment of the present invention.

Referring now to FIG. 3, there is illustrated embedded block edge artifacts along block edges 310, 320 which are reduced or eliminated in accordance with a preferred embodiment of the present invention. As will be appreciated, region 300 of a picture is illustrated, which contains four blocks including block 301. Block 301 is a motion-compensated block which is constructed in decoding system 200 from a motion vector which points to a particular matching block in a reference picture which was previously decoded by decoding system 200. Very often the block of the reference picture which is found to match the current, or target block 301 will not line up along the (8×8) boundaries into which pictures are tiled and encoded and decoded. Thus, a motion-compensated block 301 may contain embedded block edges 320 and 310, as illustrated in FIG. 3. As will be understood, these embedded block edges correspond to edges of blocks of the reference picture which constitute the matched reference block. As will further be understood, because block edge artifacts may exist along block edge boundaries in the previous, reference picture, these block edges may be imported into the central portions of a motion-compensated block such as block 301.

As already explained, any such block edge artifacts will tend to persist and not decay with time when integer pixel motion compensation is utilized rather than fractional pixel motion compensation. Therefore, in the present invention, in order to reduce such artifacts, decoding system 200 applies filtering, as described in further detail below, along the embedded block edge boundaries such as block edges 310, 320. This allows selective filtering to be applied solely to potentially artifactual or problematic areas of the block in integer pixel motion-compensation schemes, without wasting extra processing time filtering other regions of the block, and without filtering out useful information such as high-frequency details in other portions of the block. As will be understood, because each block of region 300 may be motion compensated along different motion vectors, the embedded block edges in each block need not match up, although for illustrative purposes embedded block edges 321, 311 are shown as matching horizontally and vertically with edges 320, 310 respectively through adjacent blocks of region 300 in FIG. 3.

Figure 4:
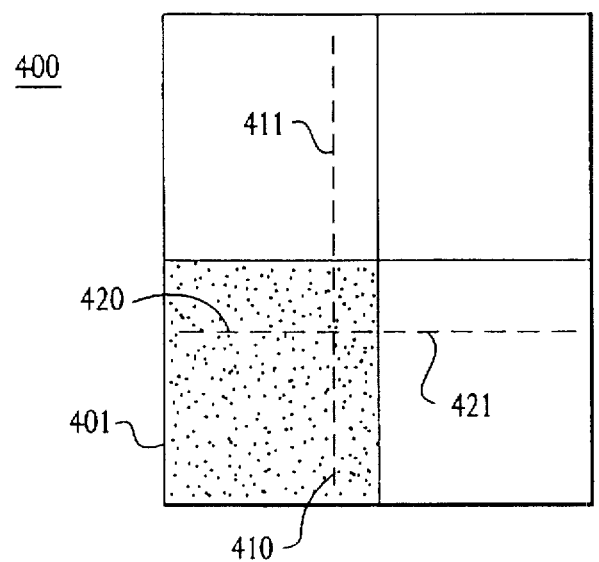
FIG. 4 illustrates block edge artifacts in "flat" and "busy" regions of a picture.

Additionally, the present invention recognizes that block edge artifacts are less visible in "busy" regions, i.e. regions having complex visual information or high frequency details. Referring now to FIG. 4, there is illustrated block edge artifacts 420, 410 in "flat" and "busy" regions of a picture. Block 401 is shown dotted to indicate that it contains high-frequency details such as foliage, which may for example be waving in a breeze from picture to picture in the video picture sequence. In this case, block edges such as 420, 410 are not as visible as they are in "flat" images, i.e. in regions containing no or little high-frequency detail or features, such as an image of a clear, light-blue sky. Therefore, in a preferred embodiment, decoding system 200 filters such embedded block edges in integer based schemes only for flat blocks, i.e. those that lack high-frequency detail. As will be appreciated, decoding system 200 may determine in a variety of ways whether a block contains enough high-frequency detail to omit the filtering step, e.g. by examining the higher-frequency components of the DCT coefficients representing the block. As will be understood, the amount of high-frequency detail in a block may be quantified and if below a certain threshold, the filtering along embedded block edges 310, 320 will proceed.

In a preferred embodiment of the invention, it is also recognized that block edge artifacts along block edges 320, 310 are not likely to exist when a block such as block 301 is decoded using a motion vector and residual error. When a difference block is transmitted along with a motion vector by encoding system 100 to represent block 301, the residual error information in the difference block will tend to eliminate or reduce any block edge artifacts along embedded block edges such as block edges 310, system filters along preferred embodiment, decoding system filters along embedded block edges in integer-based motion compensation schemes only when the block is encoded with a motion vector but without residual error correction.

As will be appreciated, the above-described requirements of filtering only when there is no residual error, and only when the block contains less than a predetermined amount of high-frequency information, may be applied independently or in combination.

Low-Pass Filtering

As will be appreciated, various filters may be employed along the region immediately around embedded block edges 310, 320. For example, a simple one-dimensional linear low-pass filter may be employed, as illustrated by double-ended arrows 330. Referring to vertical embedded block edge 310, edge 310 is between two adjacent columns of pixels within block 301, as will be understood. For a given row, each pixel p adjacent to edge 310 may be filtered using a 1-2-1 tap filter, in which its value is replaced with $(P_L+2_p+P_R)/4$, where $P_L$ and $P_R$ are the pixels immediately to the left and right of p, respectively. As will be appreciated, filters having other weights, non-linear filters, two-dimensional and three-dimensional filters may also be employed for low-pass filtering purposes. Further, pixels farther away from an edge may also be filtered, preferably with increasingly weaker filters.

Flow Chart

Figure 5:
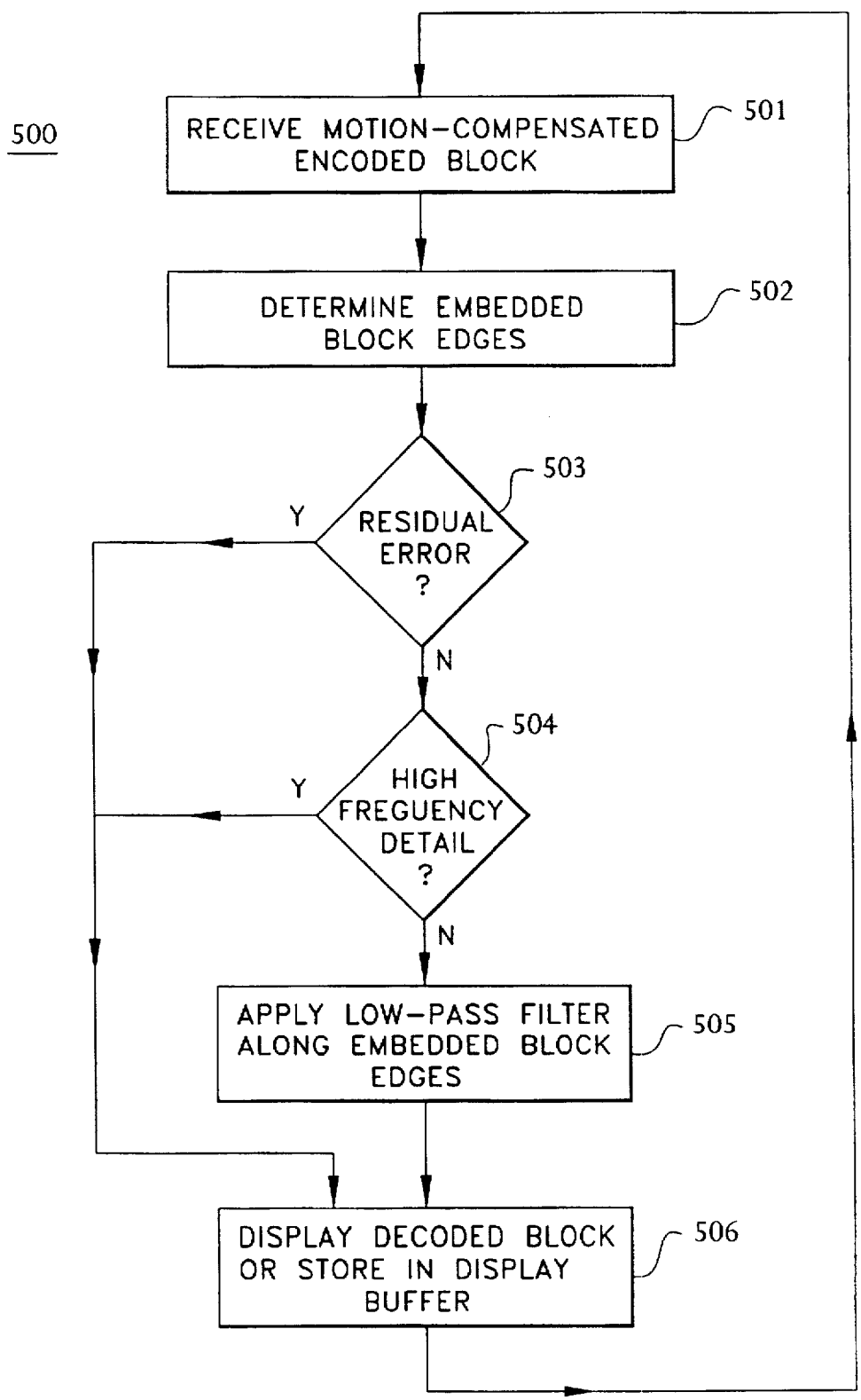
FIG. 5 is a flow chart of the method of operation of the video system of FIG. 1.

Referring now to FIG. 5, there is shown flow chart 500 of the method of operation of video decoding system 200 of FIG. 2. As illustrated, decoding system 200 applies selective filtering of motion-compensated blocks in integer pixel motion-compensation coding systems as follows. First, decoding system 200 receives the next motion-compensation encoded block (step 501 of FIG. 5). As will be understand, such a block is represented by at least a motion vector, and possibly also be a difference block comprising residual error correction information. Next, decoding system 200 determines embedded block edges, such as embedded block edges 310, 320 of block 301 of FIG. 3 (step 502). As will be understood, the location of such embedded block edges may can easily be determined by decoding system 200, given the motion vector associated with the current block, which points to a particular region of a previously-decoded reference picture.

Decoding system 200 then determines whether the current block is encoded with residual error, e.g. a difference block comprising such residual error information (step 503). If so, as explained above, the low-pass filtering step 505 is skipped. Otherwise, decoding system 200 checks to see whether the current block contains more than a predetermined amount of high-frequency information (step 504). If so, as explained hereinabove any embedded block edge artifacts will be largely invisible and thus filtering step 505 is again skipped.

If, however, the current block is encoded without residual error and does not have a significant amount of high frequency detail which could mask any artifacts, a low pass filter as hereinabove described is applied along the embedded block edges (step 505). As will be understood, a 1-2-1 one-dimensional linear low pass tap filter may be utilized for this purpose, with progressively weaker filters such as 1-6-1 filters applied to pixels farther away from a block edge. Thus the low pass filter applied along the embedded block edge boundaries is a local filter, as will be understood by those skilled in the art.

Thereafter, the decoded block, either filtered or not, may be displayed (step 506) or stored in a display buffer or both. Alternatively, the decoded block may be stored in a memory device such as mass storage device 212. The above-described steps are then repeated for another block, as illustrated by the feedback loop from steps 506 to 501.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for decoding integer motion-compensated blocks of a picture of a sequence of pictures, comprising the steps of:

(a) decoding a current block, wherein the current block is an integer motion-compensation encoded block;

(b) determining embedded block edges within the current block;

(c) determining whether the current block was encoded with residual error correction in which a difference block is utilized which represents the difference between the current block and a reference block used to reproduce the current block; and (d) applying a low-pass filter along the embedded block edges only if the current block was not encoded with residual error correction.

2. The method of claim 1, further comprising the steps of:

(e) receiving with a decoding system the current motion-compensation encoded block from an encoding system; and (f) storing the decoded current block in a memory device of the decoding system; wherein step (e) precedes step (a).

3. The method of claim 1, wherein:

the current block is associated with a motion vector; and step (a) comprises the step of retrieving pixels of a match block in a previously decoded picture in accordance with the motion vector of the current block.

4. The method of claim 3, wherein:

the previously decoded picture comprises a plurality of blocks having block edges; and step (b) comprises the step of determining the embedded block edges to be block edges of the previously decoded picture that lie within the match block.

5. The method of claim 1, wherein:

step (d) comprises the step of applying a low-pass tap filter to pixels of the decoded current block adjacent to the embedded block edges.

6. The method of claim 5, wherein the low-pass tap filter is a 1-2-1 tap filter.

7. The method of claim 1, wherein blocks of a picture comprise (8×8) blocks of pixels.

8. The method of claim 1, wherein blocks of a picture comprise macroblocks.

9. The method of claim 1, further comprising the step of:

(e) quantifying the high-frequency information in the current block to provide a high-frequency parameter;

wherein the step of applying a low-pass filter is performed only if the current block was not encoded with residual error correction and only if the high-frequency parameter is below a predetermined threshold.

10. The method of claim 1, further comprising the step of:

quantifying the high-frequency information in the current block to provide a high-frequency parameter;

wherein the step of applying a low-pass filter is performed only if the high-frequency parameter is below a predetermined threshold.

11. A computer-implemented apparatus for decoding integer motion-compensated blocks of a picture of a sequence of pictures, comprising:

(a) means for decoding a current block, wherein the current block is an integer motion-compensation encoded block;

(b) means for determining embedded block edges within the current block;

(c) means for determining whether the current block was encoded with residual error correction in which a difference block is utilized which represents the difference between the current block and a reference block used to reproduce the current block: and (d) low-pass filter means for filtering along the embedded block edges only if the current block was not encoded with residual error corrections.

12. The apparatus of claim 11, further comprising:

(e) means for receiving with a decoding system the current block from an encoding system; and (f) means for storing the decoded current block in a memory device of the decoding system;

wherein means (e) receives the current block before means (a) decodes the current block.

13. The apparatus of claim 11, wherein:

the current block is associated with a motion vector; and means (a) comprises means for retrieving pixels of a match block in a previously decoded picture in accordance with the motion vector of the current block.

14. The apparatus of claim 13, wherein:

the previously decoded picture comprises a plurality of blocks having block edges; and means (b) comprises means for determining the embedded block edges to be block edges of the previously decoded picture that lie within the match block.

15. The apparatus of claim 11, wherein:

means (c) comprises means for the step of applying a low-pass tap filter to pixels of the decoded current block adjacent to the embedded block edges.

16. The apparatus of claim 15, wherein the low-pass tap filter is a 1-2-1 tap filter.

17. The apparatus of claim 11, wherein blocks of a picture comprise (8×8) blocks of pixels.

18. The apparatus of claim 11, wherein blocks of a picture comprise macroblocks.

19. The apparatus of claim 11, further comprising the step of:

(e) quantifying the high-frequency information in the current block to provide a high-frequency parameter;

wherein the step of applying a low-pass filter is performed only if the current block was not encoded with residual error correction and only if the high-frequency parameter is below a predetermined threshold.

20. The apparatus of claim 11, further comprising:

means for quantifying the high-frequency information in the current block to provide a high-frequency parameter;

wherein the filtering of means (d) is performed only if the high-frequency parameter is below a predetermined threshold.

21. The apparatus of claim 11, further comprising:

a bus; and a memory device electrically connected to the bus.

* * * * *